(12) United States Patent
Mattmann

(10) Patent No.: US 6,874,376 B2
(45) Date of Patent: Apr. 5, 2005

(54) DEVICE FOR MEASURING THE AXLE LOAD OF A MOTOR VEHICLE

(75) Inventor: Erich Mattmann, Heidesheim (DE)

(73) Assignee: Siemens Aktiengesellschaft, München (DE)

(*) Notice: Subject to any disclaimer, the term of this patent is extended or adjusted under 35 U.S.C. 154(b) by 0 days.

(21) Appl. No.: 10/165,608

(22) Filed: Jun. 7, 2002

(65) Prior Publication Data
US 2003/0010106 A1 Jan. 16, 2003

(30) Foreign Application Priority Data
Jul. 5, 2001 (DE) .......................... 101 32 692

(51) Int. Cl.⁷ .............................. G01L 1/22
(52) U.S. Cl. .................... 73/862.045; 73/862.044
(58) Field of Search ................ 73/11.04, 11.07, 73/118.1, 121, 862, 862.041, 862.042, 862.043, 862.044, 862.045

(56) References Cited

U.S. PATENT DOCUMENTS

| | | | | |
|---|---|---|---|---|
| 3,780,817 A | * | 12/1973 | Videon ........................ 177/136 |
| 4,042,049 A | * | 8/1977 | Reichow et al. ............. 177/137 |
| 4,155,263 A | * | 5/1979 | Frantz .......................... 73/771 |
| 4,739,666 A | * | 4/1988 | Hafner et al. ............. 73/862.68 |
| 5,127,277 A | * | 7/1992 | Forrester et al. ........ 73/862.541 |
| 5,186,043 A | * | 2/1993 | Yamaoka et al. .......... 73/118.1 |
| 5,327,791 A | * | 7/1994 | Walker ................... 73/862.628 |
| 5,710,716 A | | 1/1998 | Hurst et al. |
| 6,683,525 B2 | * | 1/2004 | Brinkis et al. ................. 338/2 |

FOREIGN PATENT DOCUMENTS

| | | |
|---|---|---|
| DE | 3531245 | 8/1986 |
| DE | 19747001 | 5/1999 |
| WO | 9922210 | 5/1999 |

* cited by examiner

Primary Examiner—Eric S. McCall
(74) Attorney, Agent, or Firm—Martin A. Farber

(57) ABSTRACT

In a device for measuring the axle load of a motor vehicle, at least one extension-sensitive resistor is arranged on at least one component of a motor vehicle which is subject to a change in shape as a function of the load, with at least one insulating layer being arranged in between.

14 Claims, 1 Drawing Sheet

DEVICE FOR MEASURING THE AXLE LOAD OF A MOTOR VEHICLE

FIELD AND BACKGROUND OF THE INVENTION

The invention relates to a device for measuring the axle load of a motor vehicle.

SUMMARY OF THE INVENTION

It is an object of the present invention to determine the axle load of motor vehicles in as simple and inexpensive a manner as possible, and in particular to avoid overloading of the motor vehicle, which may lead to dangerous driving states and therefore to a danger of traffic accidents.

The object according to the invention is achieved by the fact that at least one extension-sensitive resistor is arranged on at least one component of a motor vehicle which is subject to a change in shape as a function of the load, with at least one insulating layer being arranged in between.

The device according to the invention is preferably designed in such a manner that the component serves as a metallic support for the at least one extension-sensitive resistor, and that at least one further conductor track, which is connected to at least one conductor track of the extension-sensitive resistor, is applied to the surface of the metallic support.

The measures which are listed in the further subclaims allow advantageous refinements and improvements to be made to the invention described in the main claim.

Devices according to the invention can be arranged at various points on the chassis which are subject to load and are able to detect individual stresses, so that it is possible to determine how the load is distributed. A central electronic control unit is then able to process these force-action signals and to use comparison software to determine whether there is any danger to the occupant(s) of the vehicle and ultimately to traffic as a whole as a result of the permissible gross weight having been exceeded.

By way of example, if an overload is detected, this could lead to the motor vehicle becoming impossible to start or to the driver being warned of this fact.

BRIEF DESCRIPTION OF THE DRAWINGS

The invention allows numerous embodiments. One of these is diagrammatically depicted in the drawing with reference to a number of figures and is described below. In the drawing.

DETAILED DESCRIPTION OF THE PREFERRED EMBODIMENT

Figure 2:
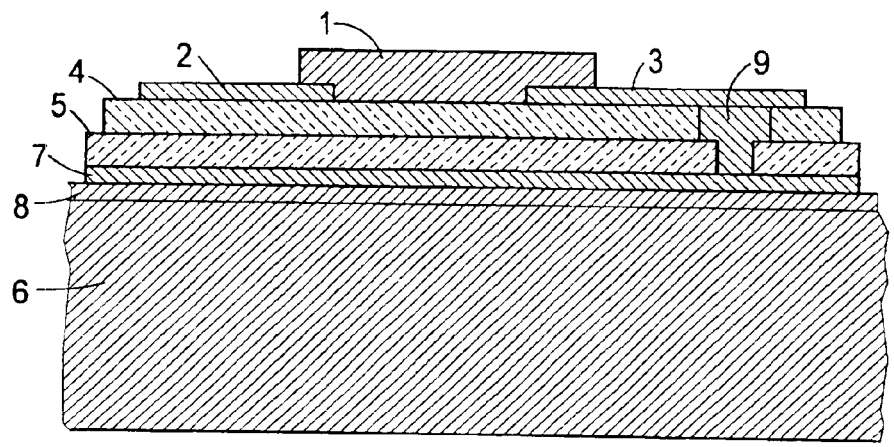
FIG. 2 shows a first exemplary embodiment.
Figure 3:
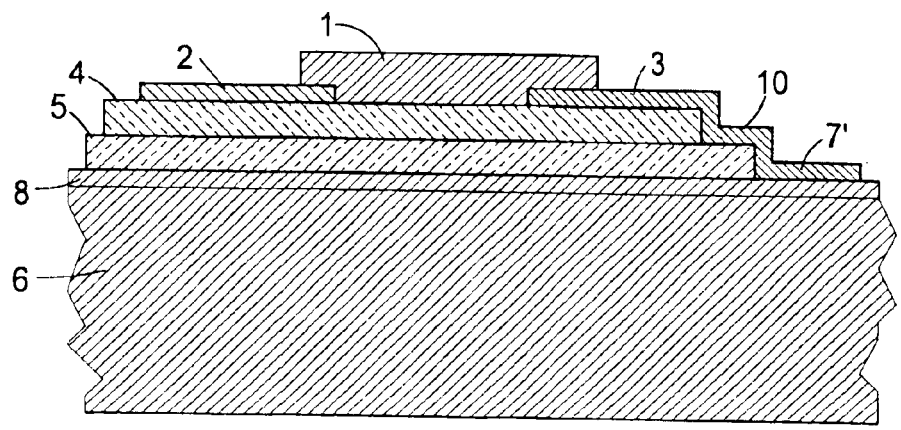
FIG. 3 shows a second exemplary embodiment of a sensor used in a device according to the invention.

Identical parts are provided with identical reference numerals throughout the various figures. FIGS. 2 and 3 each show enlarged excerpts of sectional illustrations, in which in particular the layer thicknesses are greatly exaggerated.

Figure 1:
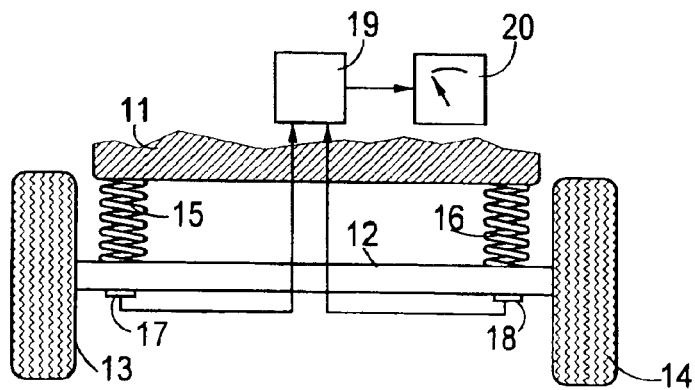
FIG. 1 diagrammatically depicts the arrangement of devices according to the invention on a motor vehicle.

FIG. 1 diagrammatically depicts parts of a motor vehicle which are required for explanation of the invention, with a body 11, an axle 12, wheels 13, 14 and springs 15, 16, which are supposed to represent the entire suspension system, including suspension links, springs and shock absorbers. On the axle 12 there are in each case two sensors 17, 18, which measure the extension of the axle beneath the springs 15, 16 and therefore the bending moment of the axle 12. Therefore, the load which acts on the axle 12 from the wheels 13, 14 is also measured indirectly. The signals which are output by the sensors 17, 18 are fed to a measurement circuit 19, which calculates the load from the signals and controls a display device 20.

Advantageous sensors are explained below in connection with FIGS. 2 and 3. An extension-sensitive resistor 1 is connected to two conductor tracks 2, 3. These are applied to an insulating layer 4, which in turn is mounted on a further insulating layer 5. A steel support 6, which in the case illustrated in FIG. 1 is the axle 12, has on its surface an oxide layer 8 which results from manufacturing conditions and is merely indicated in the figures.

In the exemplary embodiment shown in FIG. 2, a conductor track is applied to the support 6 as a result of first of all a conductor track paste being printed on, and then this paste being fired at elevated temperature. During the firing operation, silver atoms penetrate into the oxide layer, so that the latter is "cracked". As a result, a connection of good conductivity is created between the support 6 and the conductor track 7. The insulating layers 4 and 5 have holes 9 into which conductor track paste penetrates during application of the conductor track 3, thus producing a conductive connection between the conductor track 7 and the conductor track 3.

In the exemplary embodiment shown in FIG. 3, to make contact with the support 6 there is only a conductor track 7', which runs at the edge of the insulating layer 5 and is connected to the conductor track 3 via a connecting conductor track 10. The conductor tracks 3, 7' and 10 can be produced in a simple manner, as can the conductor track 2, in a single operation.

I claim:

1. A device for measuring an axle load of a motor vehicle, comprising at least one sensor having an extension-sensitive resistor (1), a first conductor track (2), and a second conductor track (3) with said resistor connecting between said first conductor track (2) and said second conductor track (3); wherein said at least one sensor is arranged on at least one component (12) of a motor vehicle, which component is subject to a change in shape as a function of the axle load, and with at least one insulating layer (4, 5) being arranged in between the extension-sensitive resistor of said at least one sensor and the component of the vehicle, wherein there is at least one further conductor track (7,7') located between the at least one insulating layer (4, 5) and the component of the vehicle, the at least one sensor having an electrical output indicative of stress in said component produced by said change in shape in response to a loading of the vehicle axle; and wherein there is an electrically conductive leadthrough across said at least one insulating layer between the second conductor track and said at least one further conductor track (7).

2. The device as claimed in claim 1, wherein the component serves as a metallic support (6) for the at least one extension-sensitive resistor. and at least one further conductor track (7, 7'), which is connected to said second conductor track (3) of the extension-sensitive resistor, is applied to a surface of the metallic support (6).

3. The device as claimed in claim 2, wherein the at least one further conductor track (7) is arranged between the at least one insulating layer (4, 5) and the metallic support (6), and said conductive leadthrough is provided from the further conductor track (7) to the second conductor track (3).

4. The device as claimed in claim 2, wherein the at least one further conductor track (7') is applied to the metallic support (6) next to the at least one insulating layer (4, 5), and the at least one further conductor track (7') is connected to the second conductor track (3) with aid of said leadthrough which leads over a surface of the at least one insulating layer (4, 5).

5. The device as claimed in claim 1, wherein the at least one further conductor track (7, 7') is made of silver.

6. The device as claimed in claim 1, wherein signals from the at least one extension-sensitive resistor (1) which are arranged at various locations (17, 18) on the motor vehicle are feedable to a processor (19) for analysis and display (20).

7. A device for measuring the axle load of a motor vehicle, wherein at least one component (12) of the motor vehicle serves as a metallic support member (6), wherein the metallic support member carries an extension-sensitive resistor (1) with at least one conductor track (3), wherein further between the metallic support member and the extension-sensitive resistor (1) one oxide layer and at least one insulating layer are arranged and wherein the conductor track is connected to a further conductor track which is arranged between the oxide layer and the at least one insulating layer by means of a conductive lead-through.

8. A device for measuring the axle load of a motor vehicle, wherein at least one component (12) of the motor vehicle serves as a metallic support member (6), wherein the metallic support member carries an extension-sensitive resistor (1) with at least one conductor track (3), wherein further between the metallic support member and the extension-sensitive resistor (1) one oxide layer and at least one insulating layer are arranged, and wherein the at least one conductor track (3) is connected to at least one further conductor track (7') which is arranged on the oxide layer (8) besides the insulating layer (4, 5) by means of a linking conductor track (10).

9. The device as claimed in claim 7, wherein the at least one further conductor track (7, 7') consists of silver.

10. The device as claimed in claim 7, comprising a plurality of extension-sensitive resistors including said at least one resistor, wherein signals derived from several of said extension-sensitive resistors (1), which are arranged at various locations (17, 18) on the motor vehicle, are applied to a processor (19) for analysis and display (20).

11. The device as claimed in claim 8, wherein the component (12) serves as metallic support member (6) for the at least one extension-sensitive resistor (1).

12. The device as claimed in claim 8, wherein the at least one further conductor track (7, 7') consists of silver.

13. The device as claimed in claim 8, comprising a plurality of extension-sensitive resistors including said at least one resistor, wherein signals derived from several of said extension-sensitive resistors (1), which are arranged at various locations (17, 18) on the motor vehicle, are applied to a processor (19) for analysis and display (20).

14. A device for measuring an axle load of a motor vehicle, comprising at least one sensor having an extension-sensitive resistor (1), a first conductor track (2), and a second conductor track (3) with said resistor connecting between said first conductor track (2) and said second conductor track (3); a component, (12) of a motor vehicle, which vehicular component is subject to a change in shape as a function of the axle load; at least one insulating layer (4, 5) located between the extension-sensitive resistor of said at least one sensor and said vehicular component, at least one further conductor track (7,7') located between the at least one insulating layer (4, 5) and the vehicular component and an electrically conductive leadthrough across said at least one insulating layer between the second conductor track and said at least one further conductor track (7), and wherein the at least one sensor has an electrical output indicative of said stress in said vehicular component produced by said change in shape in response to a loading of the vehicle axle.

* * * * *